(12) United States Patent
Chapman

(10) Patent No.: US 10,791,241 B1
(45) Date of Patent: Sep. 29, 2020

(54) VECTOR PATTERN MACRO GLOSS

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/423,645

(22) Filed: May 28, 2019

(51) Int. Cl.
H04N 1/32 (2006.01)
G03G 13/01 (2006.01)

(52) U.S. Cl.
CPC ......... H04N 1/32309 (2013.01); G03G 13/01 (2013.01); *G03G 2215/00805* (2013.01); *G03G 2215/018* (2013.01)

(58) Field of Classification Search
CPC ............... H04N 1/32309; G03G 13/01; G03G 2215/00805; G03G 2215/018
USPC ................................ 358/3.28, 1.9, 1.15, 539
See application file for complete search history.

(56) References Cited

U.S. PATENT DOCUMENTS

| | | |
|---|---|---|
| 6,352,806 B1 | 3/2002 | Dalal |
| 7,639,400 B2 | 12/2009 | Hains |
| 8,310,718 B2 | 11/2012 | Chapman et al. |
| 8,675,259 B2 | 3/2014 | Chapman et al. |
| 8,730,527 B2 | 5/2014 | Chapman et al. |
| 9,148,546 B2 | 9/2015 | Miller et al. |
| 9,541,882 B2 | 1/2017 | Yukie et al. |
| 9,614,995 B1 | 4/2017 | Chapman |
| 9,628,662 B1 | 4/2017 | Emmett et al. |
| 9,661,186 B1 | 5/2017 | Chapman |
| 9,674,392 B1 | 6/2017 | Chapman |
| 9,781,294 B1 * | 10/2017 | Chapman ............. H04N 1/3232 |
| 10,009,503 B1 | 6/2018 | Chapman |
| 10,237,442 B2 | 3/2019 | Chapman et al. |
| 2010/0196069 A1 | 8/2010 | Dirubio et al. |
| 2016/0267365 A1 * | 9/2016 | Totsuka ................... H04N 1/52 |
| 2017/0324882 A1 | 11/2017 | Chapman |
| 2018/0063347 A1 | 3/2018 | Conlon et al. |

* cited by examiner

*Primary Examiner* — Quang N Vo

(74) *Attorney, Agent, or Firm* — Ortiz & Lopez, PLLC; Kermit D. Lopez; Luis M. Ortiz

(57) ABSTRACT

A method, a system and a recording medium for rendering a macro gloss effect using a digital front end processor and a color printer having color marking materials involve defining a vector pattern cell, and creating a pattern ink based on the vector pattern cell. The pattern ink can be constrained to write at or near an ink limit at small sizes varying from a high toner pile to a lower toner pile within a pattern ink cell based on the vector pattern cell. One or more objects and a background can be then painted with the pattern ink to create a macro gloss effect image based on the pattern ink.

20 Claims, 8 Drawing Sheets

VECTOR PATTERN MACRO GLOSS

TECHNICAL FIELD

Embodiments are related to printing devices and techniques. Embodiments further relate to security for printed documents and anti-counterfeiting techniques. Embodiments additionally relate to specialty imaging devices, systems and methods. Embodiments further relate to techniques and devices for rendering a macro gloss effect image on a recording medium using a digital front end processor and a color printer having color marking materials.

BACKGROUND

In conventional printing processes, requiring security measures, a pattern color space having specialty imaging characteristics have been utilized to provide the security measures and prevent counterfeiting of printed materials.

In addition, in conventional printing processes, a pattern color space has been utilized, in part on variable data, such as printing logos, serial numbers, seat locations, or other types of unique identifying information on printed materials.

In security applications, it may be desirable to add information to a document that prevents or hinders alterations and counterfeiting. These security elements may conflict with the overall aesthetics of the document.

Specialty imaging has been used, conventionally, in printed materials to provide fraud protection and anti-counterfeiting measures. Some examples are in prescriptions, contracts, documents, coupons, and tickets. Typically, several specialty imaging techniques can be used at various positions in a document.

Thus, in the area of security printing, documents may be protected from copying, forging and counterfeiting using multiple techniques. Specialty Imaging is one such method of security printing, which uses standard materials such as papers inks and toners. Typically security-printing companies in the marketplace may require special (and expensive) materials. An example document is a prescription where a pharmacist would like to be able to possess a high level of confidence that a document is genuine.

MicroGloss (or Artistic Black for VIPP) or micro gloss is one such specialty imaging technique. It does not require a special tool (e.g. ultraviolet light) to view and is especially strong in anti-copying. MicroGloss uses a pair of colors, which appear about the same when viewing straight on but display a differential gloss when tilting due to the pile height of the toner or ink. FIG. 1 illustrates an image 10 of an example MicroGloss product. Note typically the entire black rectangle of MicroGloss as shown in image 10 would be visible under office illumination. For the example image 10 shown in FIG. 1, a small LED was the light source and visibility depends on the angle of the light source and the viewer.

MicroGloss is a current product of Xerox® Corporation and is used in production and office equipment. One can see from FIG. 1 that portions of the UPMC logo shown in image 10 in FIG. 1 exhibit the gloss effect (seen at an angle) and other parts do not (seen straight on). The small text, however, is actually present in the entire UPMC logo and black box. FIG. 2 illustrates a schematic diagram 20, which demonstrates that the gloss effect is based on the angles 24 of the light source 22, the observer 26 and one or more sample angles. This is true for MicroGloss and other gloss effects such as GlossMark®. Examples of MicroGloss and other specialty imaging techniques such as GlossMark® are disclosed in U.S. Patent Application Publication No. 20170324882, entitled "System and Method for Producing Seesaw Gloss Effect and Recording Medium Seesaw Gloss Effect" which published to Edward Chapman on Nov. 9, 2017 and is incorporated herein by reference in its entirety. Other examples of MicroGloss and specialty imaging techniques are disclosed in U.S. Pat. No. 9,781,294 entitled "System and Method for Rendering Micro Gloss Effect Image Patterns on a Recording Medium", which issued to Edward Chapman on Oct. 3, 2017 and is incorporated herein by reference in its entirety.

The MicroGloss (or Artistic Black) product is based on two colors appearing about the same. One has a high and the other low toner height. A differential gloss occurs between the two when tilting. It has two reasons it must be used at small sizes. The first becomes visible without tilting when a font size larger of around 7-9 points (⅑ inch) is used. The second uses a large area at or near the ink limit, which can cause issues such as not fusing correctly.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for rendering marks for use in security for printed documents and anti-counterfeiting.

It is another aspect of the disclosed embodiments to provide for an improved rendering method and system that utilizes specialty imaging.

It is further aspect of the disclosed embodiments to provide for methods and systems for rendering a vector pattern macro gloss mark.

The aforementioned aspects and other objectives and advantages can now be achieved as described herein.

In an embodiment, a method for rendering a macro gloss effect image on a recording medium using a digital front end processor and a color printer having color marking materials can be implemented. The method can involve defining a vector pattern cell, and creating a pattern ink based on the vector pattern cell, wherein the pattern ink is constrained to write at or near an ink limit at small sizes varying from a high toner pile to a lower toner pile within a pattern ink cell based on the vector pattern cell. The method can further involve painting at least one object and a background with the pattern ink to create a macro gloss effect image based on the pattern ink.

In an embodiment, the method can further involve rendering, using the color marking materials of the color printer, the macro gloss effect image. The method can further include ensuring that the vector pattern cell makes contiguous patterns with other vector pattern cells when placed next to one another.

In an embodiment of the method, the step of rendering, using the color marking materials of the color printer, the macro gloss effect image, can further involve rendering the macro gloss effect image on a recording medium comprising a substrate.

In an embodiment of the method, the macro gloss effect image can be formed on the substrate.

In an embodiment of the method, the macro gloss effect image can comprise a security element.

In an embodiment, a recording medium on which a macro gloss effect image is rendered using a digital front end processor and a color printer having color marking materials can include a substrate and color marking materials formed on the substrate. In an embodiment of the recording medium, the color marking materials can be on the substrate by: defining a vector pattern cell, creating a pattern ink based on the vector pattern cell, wherein the pattern ink is constrained to write at or near an ink limit at small sizes varying from a high toner pile to a lower toner pile within a pattern ink cell based on the vector pattern cell, and painting at least one object and a background with the pattern ink to create a macro gloss effect image based on the pattern ink and configured from the color marking materials of a color printer.

In an embodiment of the recording medium, the macro gloss effect image can be rendered using the color marking materials of the color printer.

In an embodiment of the recording medium, the vector pattern cell can make contiguous patterns with other vector pattern cells when placed next to one another.

In an embodiment of the recording medium, rendering, using the color marking materials of the color printer, the macro gloss effect image, can further involve rendering the macro gloss effect image on a recording medium comprising a substrate.

In an embodiment of the recording medium, the macro gloss effect image can be formed on the substrate.

In an embodiment of the recording medium, the macro gloss effect image can comprise a security element.

In an embodiment, a system for rendering a macro gloss effect image on a recording medium using a digital front end processor and a color printer having color marking materials can be implemented, which includes at least one processor and a memory. The memory can store instructions to cause the at least one processor to perform: defining a vector pattern cell, creating a pattern ink based on the vector pattern cell, wherein the pattern ink is constrained to write at or near an ink limit at small sizes varying from a high toner pile to a lower toner pile within a pattern ink cell based on the vector pattern cell, and painting at least one object and a background with the pattern ink to create a macro gloss effect image for rendering based on the pattern ink.

In an embodiment of the system, the instructions can be further configured for rendering, using the color marking materials of the color printer, the macro gloss effect image.

In an embodiment of the system, the instructions can be further configured for ensuring that the vector pattern cell makes contiguous patterns with other vector pattern cells when placed next to one another.

In an embodiment of the system, the rendering instructions can be further configured for rendering the macro gloss effect image on a recording medium comprising a substrate.

In an embodiment of the system, the macro gloss effect image can be formed on the substrate.

In an embodiment of the system, the macro gloss effect image can comprise a security element.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
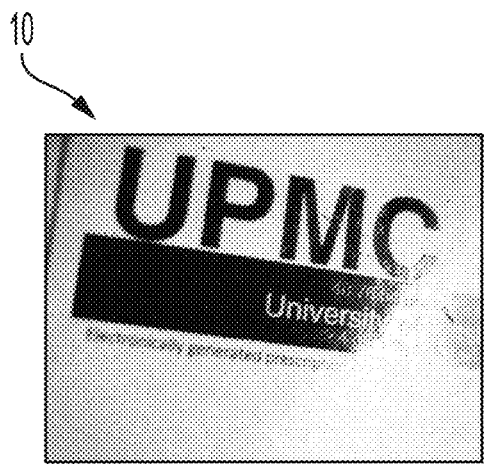
FIG. 1 illustrates an image of an example MicroGloss product.
Figure 2:
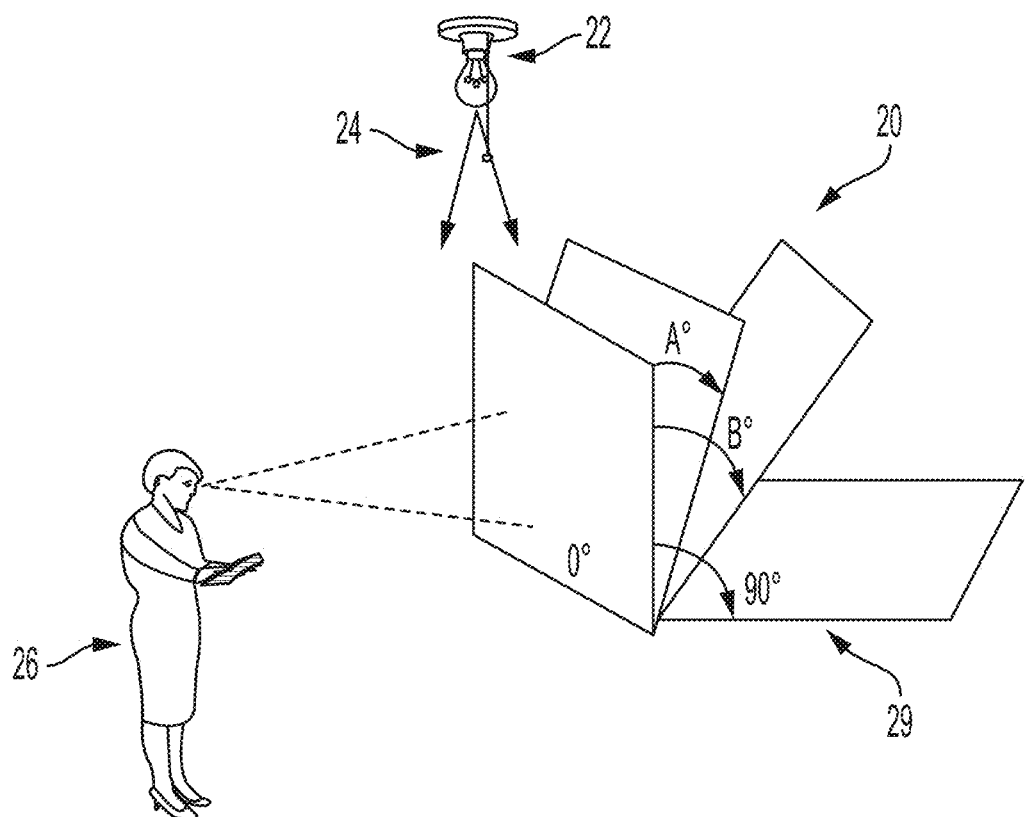
FIG. 2 illustrates a schematic diagram, which demonstrates that the gloss effect is based on the angles of the light source, the observer and one or more sample angles.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate.

The "RGB color model" is an additive color model in which red, green, and blue can be added together in various ways to reproduce a broad array of colors. The name of the model comes from the initials of the three additive primary colors, red, green, and blue.

A primary purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

Figure 3:
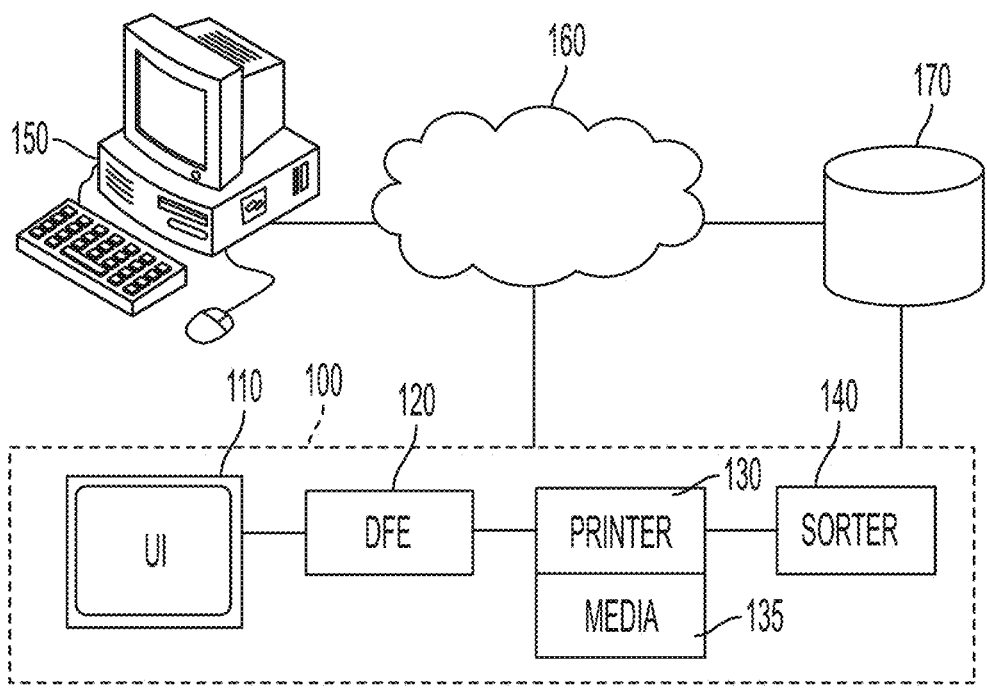
FIG. 3 illustrates a block diagram of a printing system suitable for implementing one or more of the disclosed embodiments.

With reference to FIG. 3, a printing system (or image rendering system) 100 suitable for implementing various aspects of the exemplary embodiments described herein is illustrated.

The word "printer" and the term "printing system" as used herein encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 100 can include a user interface 110, a digital front end (DFE) controller 120, and at least one print engine 130. The print engine 130 has access to print media 135 of various sizes and cost for a print job. The printing system 100 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 can operate after a job is printed by the print engine 130 to manage arrangement of the hard copy output, including cutting functions. A user can access and operate the printing system 100 using the user interface 110 or via a data-processing system such as a workstation 150. The workstation 150 can communicate bidirectionally with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 4:
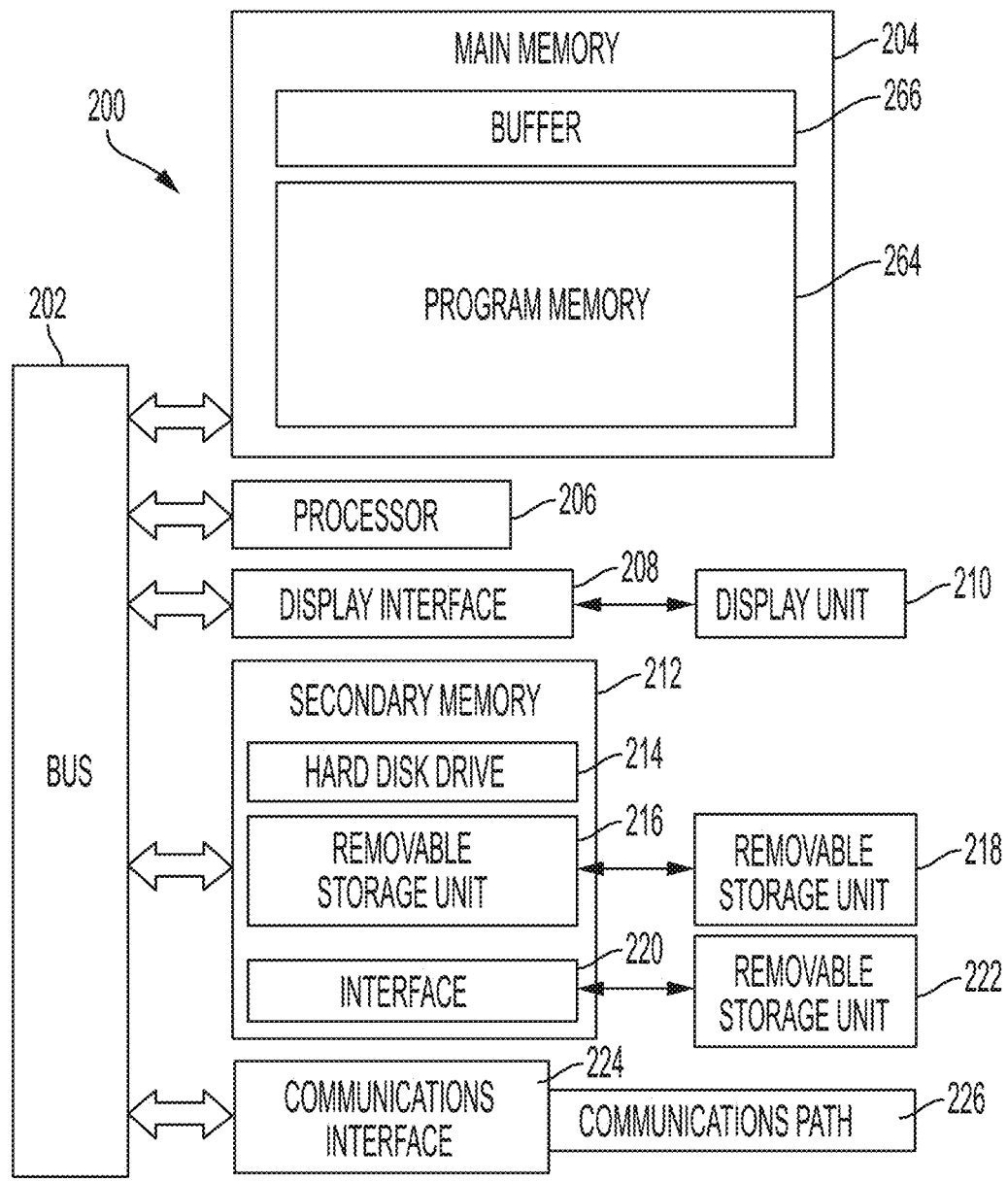
FIG. 4 illustrates a block diagram of a digital front end controller useful for implementing one or more of the disclosed embodiments.

With respect to FIG. 4, an exemplary DFE controller 200 is shown in greater detail. The digital front end 200 includes one or more processors, such as processor 206 capable of executing machine executable program instructions.

In the embodiment shown, the processor is in communication with a bus 202 (e.g., a backplane interface bus, cross-over bar, or data network). The digital front end 200 can also include a main memory 204 that is used to store machine readable instructions. The main memory is also being capable of storing data. Main memory may alternatively include random access memory (RAM) to support reprogramming and flexible data storage. Buffer 266 can be used to temporarily store data for access by the processor.

Program memory 264 can include, for example, executable programs that implement the embodiments of the methods described herein. The program memory 264 can store at least a subset of the data contained in the buffer.

The digital front end 200 can include a display interface 208 that forwards data from communication bus 202 (or from a frame buffer not shown) to a display 210. The digital front end 200 can also include a secondary memory 212 includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively may include other similar mechanisms for allowing computer programs or other instructions to be loaded into the computer system. Such mechanisms can include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end 200 can include a communications interface 224, which acts as both an input and an output to allow software and data to be transferred between the digital front end 200 and external devices. Examples of a communications interface include a modem, a network interface (such as an Ethernet card), a communications port, a PCM-CIA slot and card, etc.

Computer programs (also called computer control logic) and including one or more modules may be stored in main memory 204 and/or secondary memory 212. Computer programs or modules may also be received via a communications interface 224. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data generally stored in secondary memory 212 for access during an DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

In the some of the descriptions below, specialty imaging elements can be used in a dynamic pattern generation process to provide security features.

Figure 5:
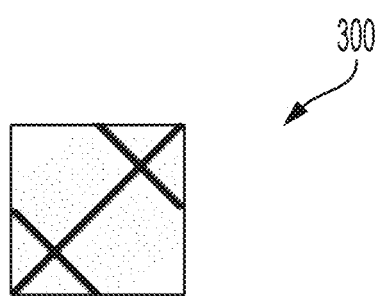
FIG. 5 illustrates a schematic diagram of a single pattern cell in accordance with an embodiment.

FIG. 5 illustrates a schematic diagram of a single pattern cell 300, in accordance with an embodiment. In a first step, a single pattern cell can be defined such as the single pattern cell 300 shown in FIG. 5. The single pattern cell 300 is shown in FIG. 5 as a crosshatched single vector pattern cell. Many geometric patterns such as interlaced circles, triangles or octagons will work for this first step. What may not work is a single geometric shape centered in the cell similar to building a halftone cell.

Figure 6:
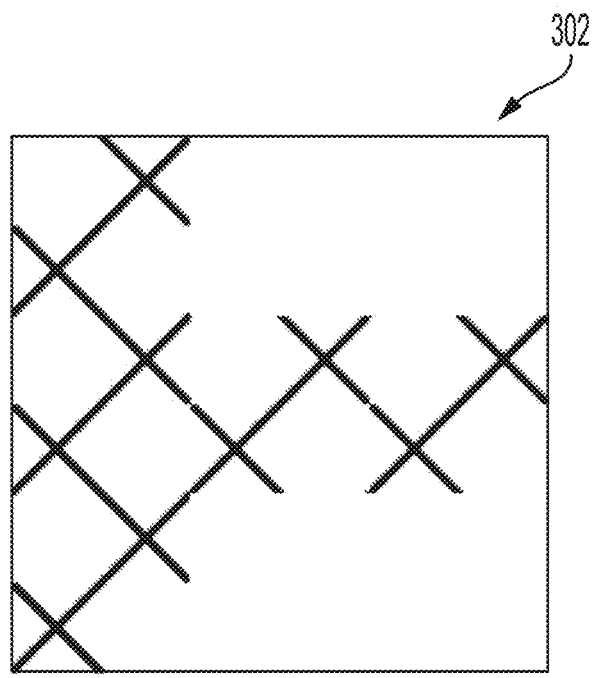
FIG. 6 illustrates a schematic diagram depicting the design of a pattern ink in accordance with an embodiment.

In a second step, an operation can be implemented to ensure that the single pattern cell 300 from the first step makes contiguous patterns when placed next to each other (top bottom, left and right) to create a pattern ink such as the pattern ink 302 shown in FIG. 6. That is, FIG. 6 illustrates a schematic diagram depicting the design of a pattern ink 302, in accordance with an embodiment.

Figure 7:
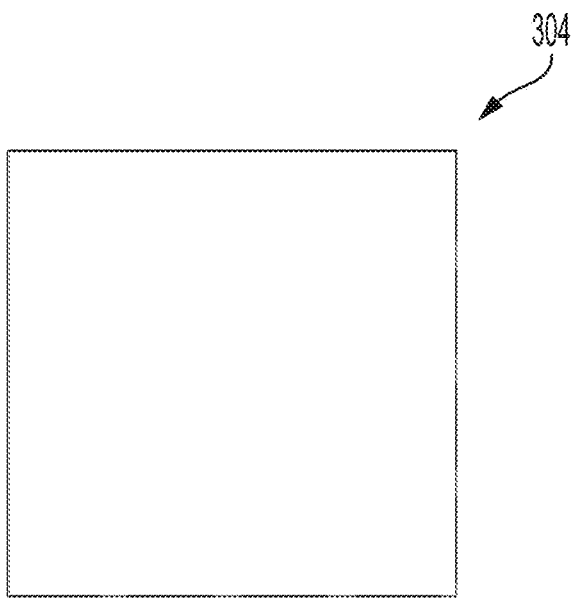
FIG. 7 illustrates a schematic diagram of a pattern ink when painted at a pixel level in accordance with an embodiment.
Figure 8:
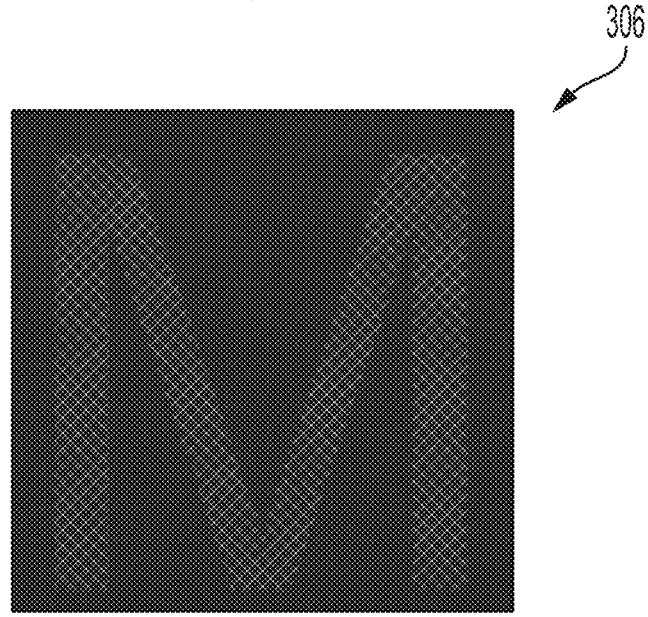
FIG. 8 illustrates an image of text in a textbox in accordance with an embodiment.

FIG. 7 illustrates a schematic diagram of a pattern ink 304 when painted at a pixel level, in accordance with an embodiment. FIG. 8 illustrates an image 306 of text in a textbox in accordance with an embodiment.

In a third step, a pattern ink paint procedure can be defined to write the white part shown in FIG. 6 with MGlow (the low toner pile color) (see, for example, the black color in FIG. 7 and FIG. 8). In a fourth step, the pattern ink paint procedure can be defined to write the vector lines with MGhigh (the high toner pile) (see, for example, the black color in FIG. 7 and a magenta color in FIG. 8).

It should be appreciated that in a color rending of the image 306 shown in FIG. 8, a magenta color may appear. Because the disclosed figures, however, are rendered in black and white, the magenta color does not appear in this disclosure, but may appear in a normal color rending. Also note that using magenta here as discussed and in FIG. 8 is for clarification and illustrative purposes only because MGhigh is about the same color as MGlow (e.g. both black), so FIGS. 7 and 8 may appear all black. In other words, reference to magenta as a color is not considered a limiting feature of the disclosed embodiments. Other color renderings are possible.

Figure 9:
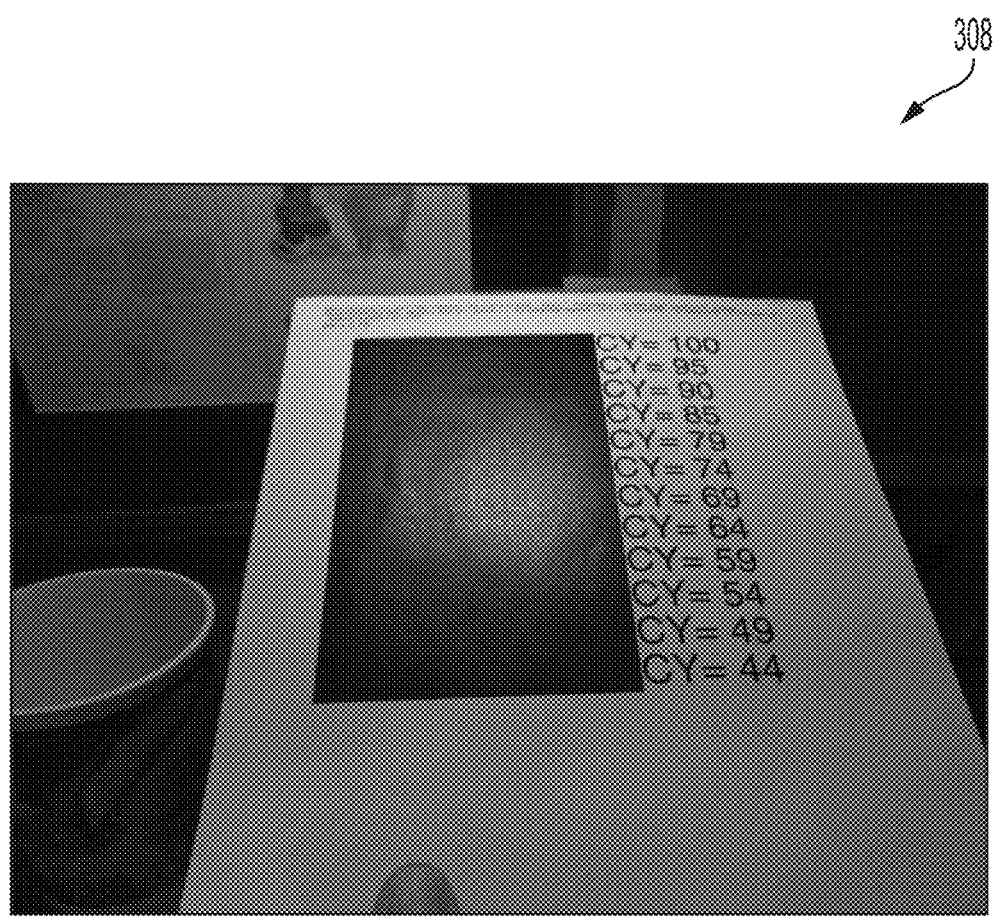
FIG. 9 illustrates an image of a document that includes the text "MACROGLOSS" on each line of the entire black rectangle in accordance with an embodiment.

FIG. 9 illustrates an image 308 of a document that includes the text "MACROGLOSS" on each line of the entire black rectangle, in accordance with an embodiment. The image 308 shown in FIG. 9 depicts the text "MACROGLOSS" on each line of the entire black rectangle. As in FIG. 1 and FIG. 9, in part of the sheet the text can be visible while the rest may not be visible, because of the angles of the light source, the observer and the sample. The text height shown in the image 308 in FIG. 9 is 36 points (½ inch) but much larger objects may be used.

Figure 10:
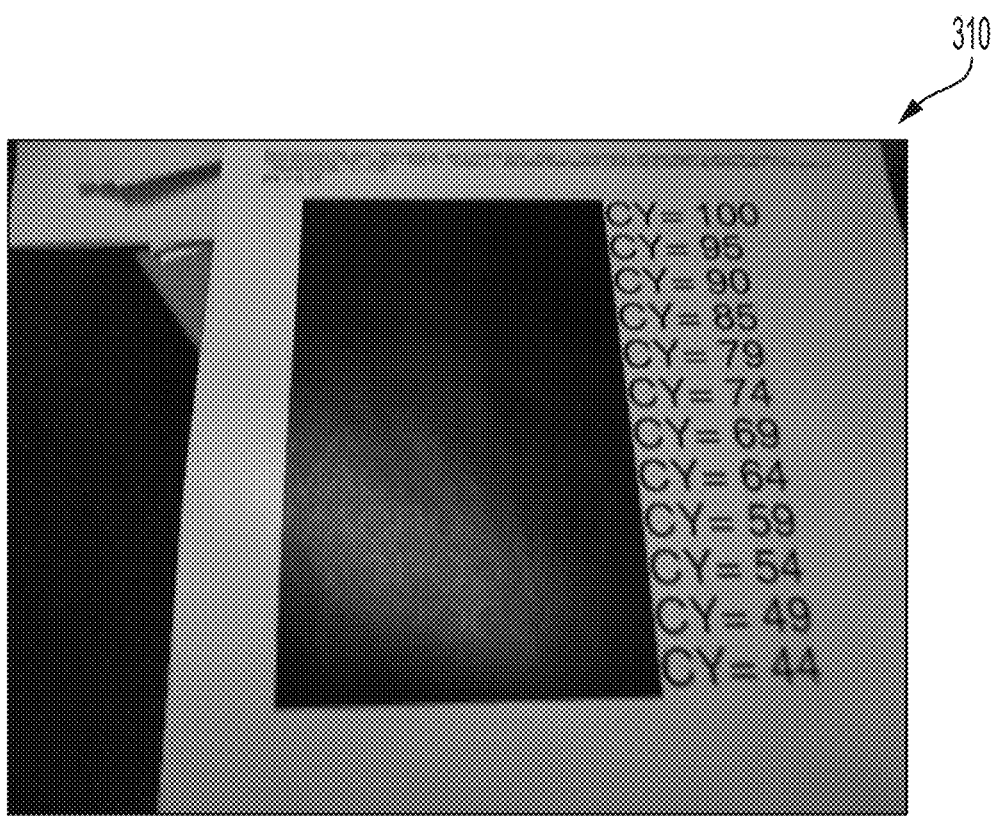
FIG. 10 illustrates another image of the same document shown in FIG. 9 including the text "MACROGLOSS" in accordance with an embodiment.

FIG. 10 illustrates another image 310 of the same document shown in FIG. 9 including the text "MACROGLOSS" in accordance with an embodiment. Note that the sample prints shown in FIGS. 9-10 were from a Xerox® WC7845 also known as a Discovery SpyGlass. Both the gloss effect and hiding between MGhigh and MGlow can vary on different printer types so swatch sheets with different variables can be tested such as:

1) MGLow starting at 100% K and adding small equal amounts of CMY. This darkened the low color improving hiding when not tilted but also lowered the gloss effect.

2) MGhigh starting at 100% CMYK and subtracting equal amounts of CMY. This will see which colors work best verses the starting point in which the ink limiter selects the colors.

3) MGhigh starting at 100% CYK and subtracting equal amounts of CY. This produced the best results on the SpyGlass in terms of hiding (where MGhigh looks the same as MGlow when not tilted).

4) Scaling starting at single pixel painting of the pattern ink and scaling up. Along with the other variables this would improve or degrade the gloss effect and hiding.

Figure 11:
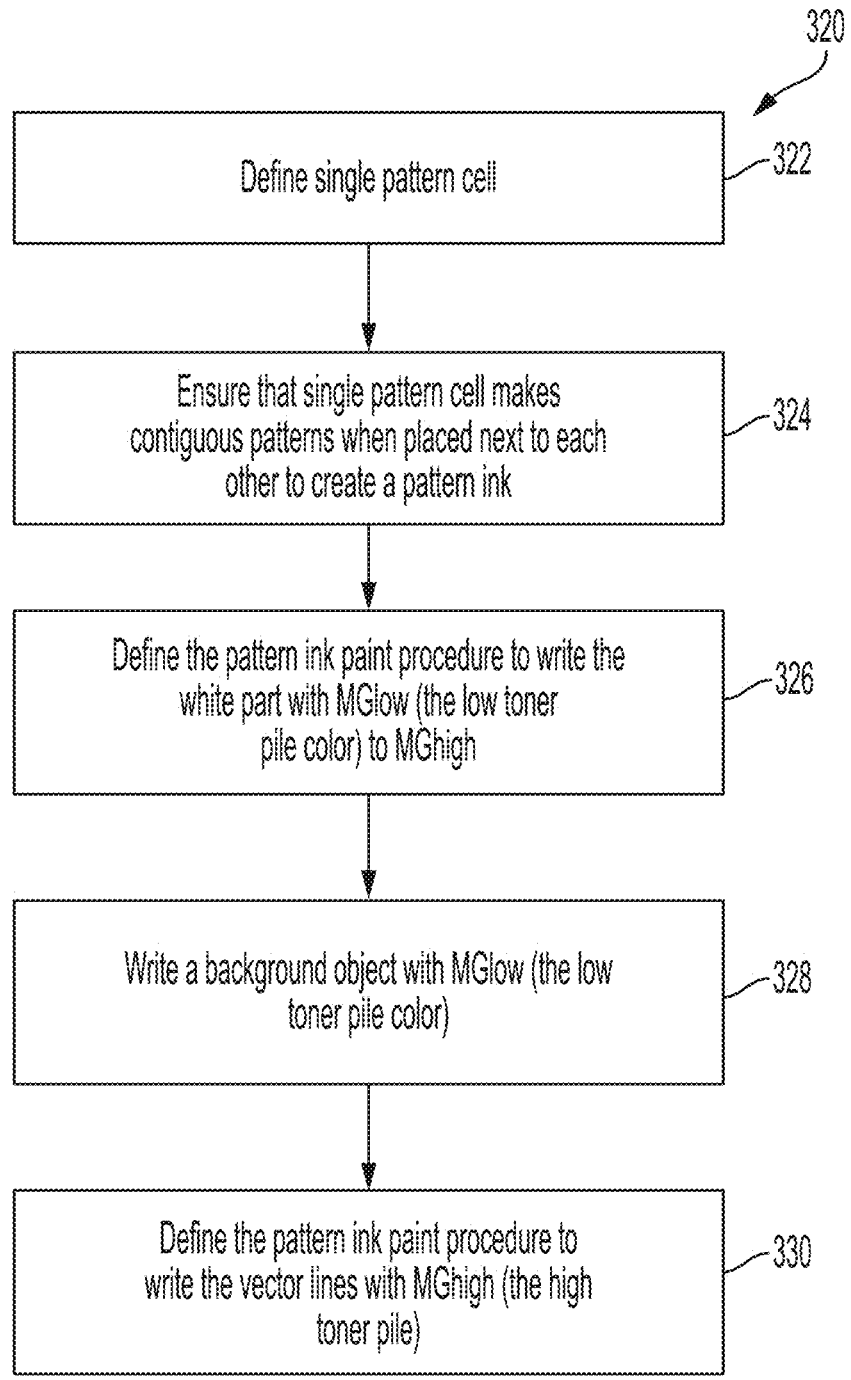
FIG. 11 illustrates a flow chart of operations depicting logical operational steps of a method for configuring a vector pattern macro gloss mark to be rendered on a recording medium, in accordance with an embodiment.

FIG. 11 illustrates a flow chart of operations depicting logical operational steps of a method 320 for creating a vector pattern macro gloss mark to be rendered on a recording medium, in accordance with an embodiment. As depicted at block 322, a step or operation can be implemented to define a single pattern cell (e.g., a crosshatched single vector pattern cell) such as shown in FIG. 5. As discussed previously, many geometric patterns such as interlaced circles, triangles or octagons and so on, can be implemented in accordance with the operation depicted at block 322.

Next, as shown at block 324, a step or operation can be implemented to ensure that the single pattern cell makes contiguous patterns when placed next to each other (i.e., top bottom, left and right) to create a pattern ink (e.g., see FIG. 6). Then, as indicated at block 326, a step or operation can be implemented to define the pattern ink paint procedure to write the white part of FIG. 5 with MGlow (the low toner pile color) (also see FIG. 6 and FIG. 7, black color) to MGhigh or in other words: MGlow 4 MGhigh. Note that MGlow may just be pure black and there may not be a white area. Additionally, PostScript normally writes opaquely so the MGlow can be written first and then the MGHigh, and the white parts of MGHigh can allow MGlow to remain.

Next, as illustrated at block 328, a step or operation can be implemented to write the background object with MGlow (the low toner pile color). Thereafter, as shown at block 330, the pattern ink paint procedure can be defined to write the vector lines with MGhigh (the high toner pile). Once these operations are completed, the resulting macro gloss effect image can be rendered on a recording medium using the color marking materials of the printing system 100 (i.e. color printer). Such a macro gloss effect image can be utilized as, for example, a security element for preventing counterfeiting.

The disclosed embodiments thus illustrate a technique that can be implemented to extend the benefits of micro gloss to large areas/large text. This approach can be executed by overlaying a fine vector structure fill such as a crosshatch or other fine geographic design over a macro object that possesses a gloss-hidden effect. The fine structure overlay can be printed using a standard MicroGloss color recipe while the rest of the object can be printed with the background color recipe. Benefits of this approach include an easy extension of MicroGloss to large areas or text, while requiring no alteration to current MicroGloss techniques.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams may represent a module, segment, or portion of instructions, which comprises one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 100 shown in FIG. 3 and/or the DFE controller 200 shown in FIG. 4. A "module" can perform the various steps, operations or instructions discussed herein, such as the steps or operations discussed herein and also shown in blocks 322, 324, 326, 328, and 330.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the disclosed embodiments. The claimed solution may be rooted in computer technology in order to overcome a problem specifically arising in the realm of computers, computer networks and call center platforms.

Based on the foregoing, it can be appreciated that a number of embodiments are disclosed herein. For example, in a preferred embodiment, a method for rendering a macro gloss effect image on a recording medium using a digital front end processor and a color printer having color marking materials can be implemented. The method can involve defining a vector pattern cell, and creating a pattern ink based on the vector pattern cell, wherein the pattern ink is constrained to write at or near an ink limit at small sizes varying from a high toner pile to a lower toner pile within a pattern ink cell based on the vector pattern cell. The method can further involve painting at least one object and a background with the pattern ink to create a macro gloss effect image based on the pattern ink.

In another embodiment, the method can further involve rendering, using the color marking materials of the color printer, the macro gloss effect image. The method can further include ensuring that the vector pattern cell makes contiguous patterns with other vector pattern cells when placed next to one another.

In another embodiment of the method, the step of rendering, using the color marking materials of the color printer, the macro gloss effect image, can further involve rendering the macro gloss effect image on a recording medium comprising a substrate.

In another embodiment of the method, the macro gloss effect image can be formed on the substrate.

In another embodiment of the method, the macro gloss effect image can comprise a security element.

In another embodiment, a recording medium on which a macro gloss effect image can be rendered using a digital front end processor and a color printer having color marking materials can include a substrate and color marking materials formed on the substrate. In an embodiment of the recording medium, the color marking materials can be on the substrate by: defining a vector pattern cell, creating a pattern ink based on the vector pattern cell, wherein the pattern ink is constrained to write at or near an ink limit at small sizes varying from a high toner pile to a lower toner pile within a pattern ink cell based on the vector pattern cell, and painting at least one object and a background with the pattern ink to create a macro gloss effect image based on the pattern ink and configured from the color marking materials of a color printer.

In another embodiment of the recording medium, the macro gloss effect image can be rendered using the color marking materials of the color printer.

In another embodiment of the recording medium, the vector pattern cell can make contiguous patterns with other vector pattern cells when placed next to one another.

In another embodiment of the recording medium, rendering, using the color marking materials of the color printer, the macro gloss effect image, can further involve rendering the macro gloss effect image on a recording medium comprising a substrate.

In another embodiment of the recording medium, the macro gloss effect image can be formed on the substrate.

In another embodiment of the recording medium, the macro gloss effect image can comprise a security element.

In another embodiment, a system for rendering a macro gloss effect image on a recording medium using a digital front end processor and a color printer having color marking materials can be implemented, which can include at least one processor and a memory. The memory can store instructions to cause the at least one processor to perform: defining a vector pattern cell, creating a pattern ink based on the vector pattern cell, wherein the pattern ink is constrained to write at or near an ink limit at small sizes varying from a high toner pile to a lower toner pile within a pattern ink cell based on the vector pattern cell, and painting at least one object and a background with the pattern ink to create a macro gloss effect image for rendering based on the pattern ink.

In another embodiment of the system, the instructions can be further configured for rendering, using the color marking materials of the color printer, the macro gloss effect image.

In another embodiment of the system, the instructions can be further configured for ensuring that the vector pattern cell makes contiguous patterns with other vector pattern cells when placed next to one another.

In another embodiment of the system, the rendering instructions can be further configured for rendering the macro gloss effect image on a recording medium comprising a substrate.

In another embodiment of the system, the macro gloss effect image can be formed on the substrate.

In another embodiment of the system, the macro gloss effect image can comprise a security element.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a macro gloss effect image on a recording medium using a digital front end processor and a color printer having color marking materials, comprising:
    defining a vector pattern cell comprising a geometric pattern cell comprising at least one of: a crosshatched single vector pattern cell, an interlaced circle pattern cell, a triangular pattern cell and an octagon pattern cell;
    creating a pattern ink based on the vector pattern cell, wherein the pattern ink is constrained to write at or near an ink limit at small sizes varying from a high toner pile to a lower toner pile within a pattern ink cell based on the vector pattern cell; and
    painting at least one object and a background with the pattern ink to create a macro gloss effect image based on the pattern ink, wherein the macro gloss effect image possesses a gloss-hidden effect.

2. The method of claim 1 further comprising:
    rendering, using the color marking materials of the color printer, the macro gloss effect image possessing the gloss-hidden effect.

3. The method of claim 1 further comprising:
    ensuring that the vector pattern cell makes contiguous patterns with other vector pattern cells when placed next to one another to create the pattern ink.

4. The method of claim 1 further comprising:
    rendering, using the color marking materials of the color printer, the macro gloss effect image; and
    ensuring that the vector pattern cell makes contiguous patterns with other vector pattern cells when placed next to one another.

5. The method of claim 2 wherein rendering, using the color marking materials of the color printer, the macro gloss effect image, further comprises: rendering the macro gloss effect image on a recording medium comprising a substrate.

6. The method of claim 5 wherein the macro gloss effect image is formed on the substrate.

7. The method of claim 1 wherein the macro gloss effect image comprises a security element.

8. A recording medium on which a macro gloss effect image is rendered using a digital front end processor and a color printer having color marking materials, comprising:
    a substrate and color marking materials formed on the substrate, the color marking materials formed on the substrate by:
        defining a vector pattern cell comprising a geometric pattern cell comprising at least one of: a crosshatched single vector pattern cell, an interlaced circle pattern cell, a triangular pattern cell and an octagon pattern cell;
        creating a pattern ink based on the vector pattern cell, wherein the pattern ink is constrained to write at or near an ink limit at small sizes varying from a high toner pile to a lower toner pile within a pattern ink cell based on the vector pattern cell; and
        painting at least one object and a background with the pattern ink to create a macro gloss effect image based on the pattern ink and configured from the color marking materials of a color printer, wherein the macro gloss effect image possesses a gloss-hidden effect.

9. The recording medium of claim 8 wherein the macro gloss effect image possessing the gloss-hidden effect is rendered using the color marking materials of the color printer.

10. The recording medium of claim 8 wherein the vector pattern cell makes contiguous patterns with other vector pattern cells when placed next to one another to create the pattern ink.

11. The recording medium of claim 8 wherein:
    the macro gloss effect image is rendered using the color marking materials of the color printer; and the vector pattern cell makes contiguous patterns with other vector pattern cells when placed next to one another.

12. The method of claim 9 wherein rendering, using the color marking materials of the color printer, the macro gloss effect image, further comprises: rendering the macro gloss effect image on a recording medium comprising a substrate.

13. The recording medium of claim 12 wherein the macro gloss effect image is formed on the substrate.

14. The recording medium of claim 8 wherein the macro gloss effect image comprises a security element.

15. A system for rendering a macro gloss effect image on a recording medium using a digital front end processor and a color printer having color marking materials, comprising:
   at least one processor and a memory, the memory storing instructions to cause the at least one processor to perform:
   defining a vector pattern cell comprising a geometric pattern cell comprising at least one of: a cross-hatched single vector pattern cell, an interlaced circle pattern cell, a triangular pattern cell and an octagon pattern cell;
   creating a pattern ink based on the vector pattern cell, wherein the pattern ink is constrained to write at or near an ink limit at small sizes varying from a high toner pile to a lower toner pile within a pattern ink cell based on the vector pattern cell; and
   painting at least one object and a background with the pattern ink to create a macro gloss effect image for rendering based on the pattern ink, wherein the macro gloss effect image possesses a gloss-hidden effect.

16. The system of claim 15 wherein the instructions are further configured for:
   rendering, using the color marking materials of the color printer, the macro gloss effect image possessing the gloss-hidden effect.

17. The system of claim 15 wherein the instructions are further configured for:
   ensuring that the vector pattern cell makes contiguous patterns with other vector pattern cells when placed next to one another to create the pattern ink.

18. The system of claim 16 wherein rendering, using the color marking materials of the color printer, the macro gloss effect image, further comprises: rendering the macro gloss effect image on a recording medium comprising a substrate.

19. The system of claim 18 wherein the macro gloss effect image is formed on the substrate.

20. The system of claim 15 wherein the macro gloss effect image comprises a security element.

* * * * *